(12) United States Patent
Wang

(10) Patent No.: US 8,801,425 B2
(45) Date of Patent: Aug. 12, 2014

(54) MOLD FOR FABRICATING LIGHT GUIDING PLATE

(75) Inventor: Jia-Ming Wang, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 48 days.

(21) Appl. No.: 13/598,773

(22) Filed: Aug. 30, 2012

(65) Prior Publication Data

US 2013/0149407 A1   Jun. 13, 2013

(30) Foreign Application Priority Data

Dec. 12, 2011   (TW) ............................ 100145679 A

(51) Int. Cl.
*B29C 33/02* (2006.01)
*B29C 33/04* (2006.01)

(52) U.S. Cl.
USPC ........... 425/411; 425/404; 425/412; 425/414; 425/468; 425/DIG. 10; 249/63; 249/102; 249/177; 249/142

(58) Field of Classification Search
CPC ........ B29C 33/02; B29C 33/04; B29C 33/42; B29C 33/424; B29C 2033/00; B29C 2033/02; B29C 2033/04

USPC .......... 425/404, 411, 412, 414, 468, DIG. 10; 249/63, 102, 177, 142

See application file for complete search history.

(56) References Cited

U.S. PATENT DOCUMENTS 6,116,888 A * 9/2000 Johnston et al. .............. 425/195
2008/0026200 A1 * 1/2008 Kim ........................... 428/304.4

* cited by examiner

*Primary Examiner* — Joseph S Del Sole
*Assistant Examiner* — Lawrence D Hohenbrink, Jr.
(74) *Attorney, Agent, or Firm* — Novak Druce Connolly Bove + Quigg LLP

(57) ABSTRACT

A mold for fabricating a light guiding plate includes an upper mold, a lower mold and a die core assembly. The upper mold defines a first cooling channel therein. The lower mold defines a cavity thereon. The die core assembly is mounted on the upper mold, and includes a base plate connected to the upper mold and a core plate detachably located at a side of the base plate facing the lower mold. The base plate defines a second cooling channel. The second cooling channel communicates with the first cooling channel respectively to cooling the mold.

17 Claims, 6 Drawing Sheets

MOLD FOR FABRICATING LIGHT GUIDING PLATE

BACKGROUND

1. Technical Field

The present disclosure relates to molds, and more particularly, to a mold for fabricating a light guiding plate.

2. Description of Related Art

A mold for fabricating a light guiding plate includes an upper mold, a core mold and, a lower mold. The lower mold defines a cavity. The core mold is fixed to the upper mold and defines microstructures on a side face thereof by laser engraving. The microstructures of the core mold face the lower mold. A plurality of water guiding pipes are located within the upper mold and the core mold to cool the core mold during molding process. Washers are employed at where the water guiding pipes of the upper mold are adjoining the water guiding pipes of the core mold to prevent water leaking.

When operating, the upper mold drives the core mold to move toward the lower mold and to seal the cavity of the core mold to fabricate a light guiding plate. When a new type of light guiding plate is to be fabricated, the original microstructures on a surface of the core mold should be removed, and new microstructures are engraved on the surface. A gasket is set between the upper mold and the core mold to compensate for a decreasing thickness of the core mold. The gasket is sandwiched between the core mold and the upper mold, thus creating a gap therebetween, and water can leak from the water guiding pipes.

Therefore, there is room for improvement in the art.

BRIEF DESCRIPTION OF THE DRAWINGS

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
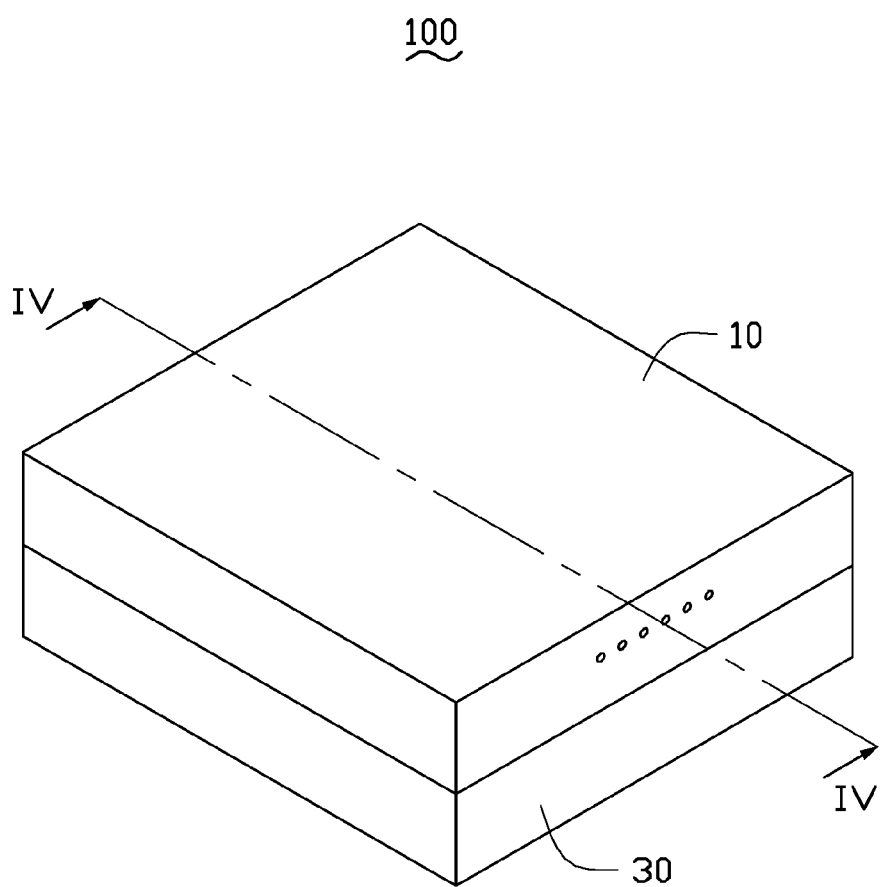
FIG. 1 is an isometric view of an embodiment of a mold.
Figure 2:
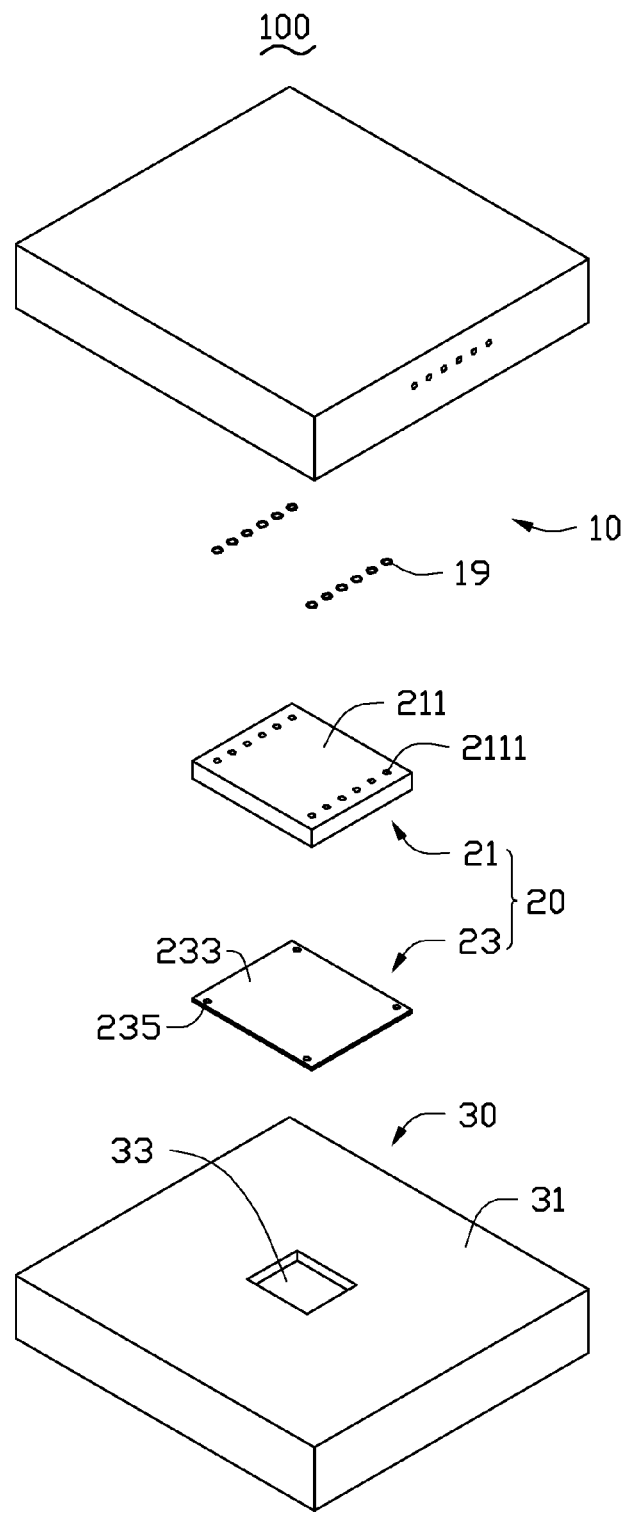
FIG. 2 is an exploded, isometric view of the mold of FIG. 1.
Figure 3:
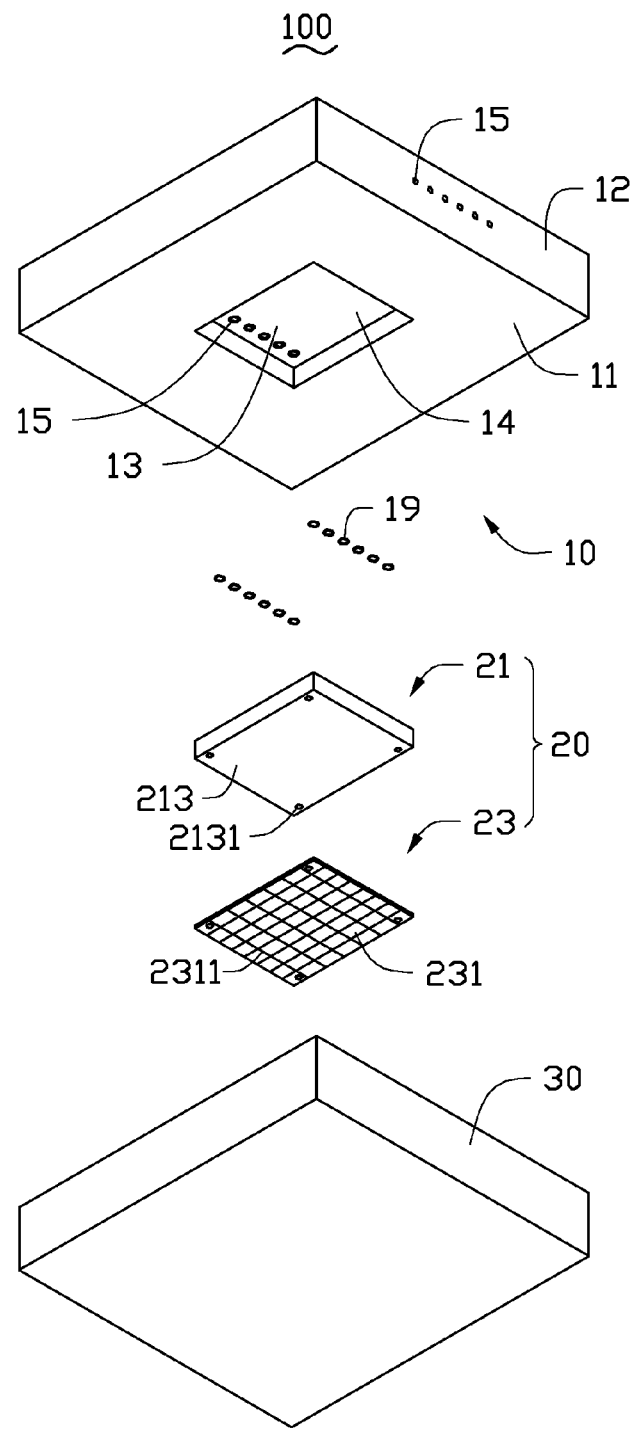
FIG. 3 is similar to FIG. 2, but viewed from another aspect.

FIGS. 1 through 3 show a mold 100 for fabricating a light guiding plate (not shown). The mold 100 includes an upper mold 10, a die core assembly 20, and a lower mold 30. The die core assembly 20 is mounted to the upper mold 10. The upper mold 10 is capable of driving the die core assembly 20 to move towards the lower mold 30 to mold a product.

Figure 4:
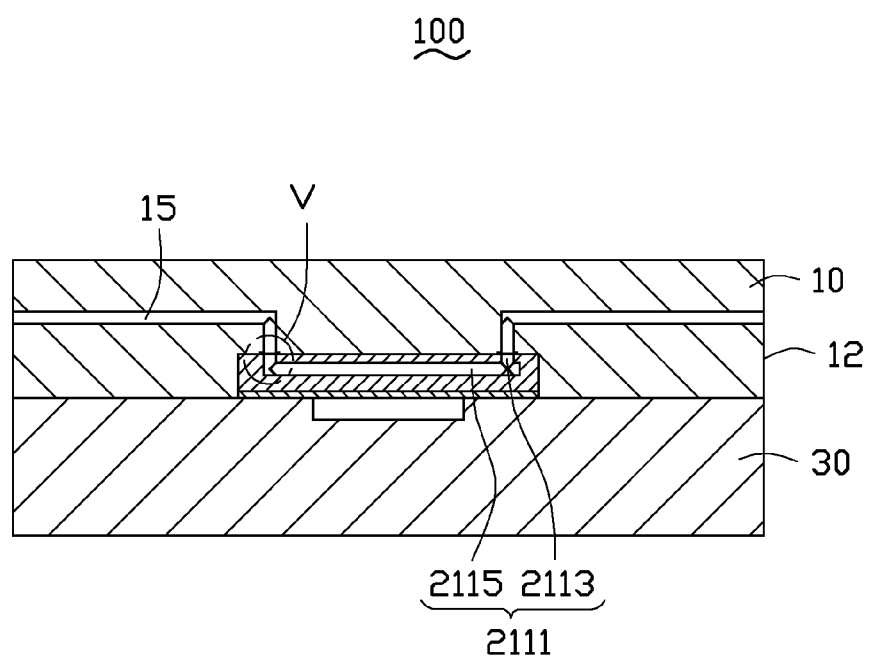
FIG. 4 is a cross-sectional view of the mold of FIG. 1, taken along line IV-IV.
Figure 5:
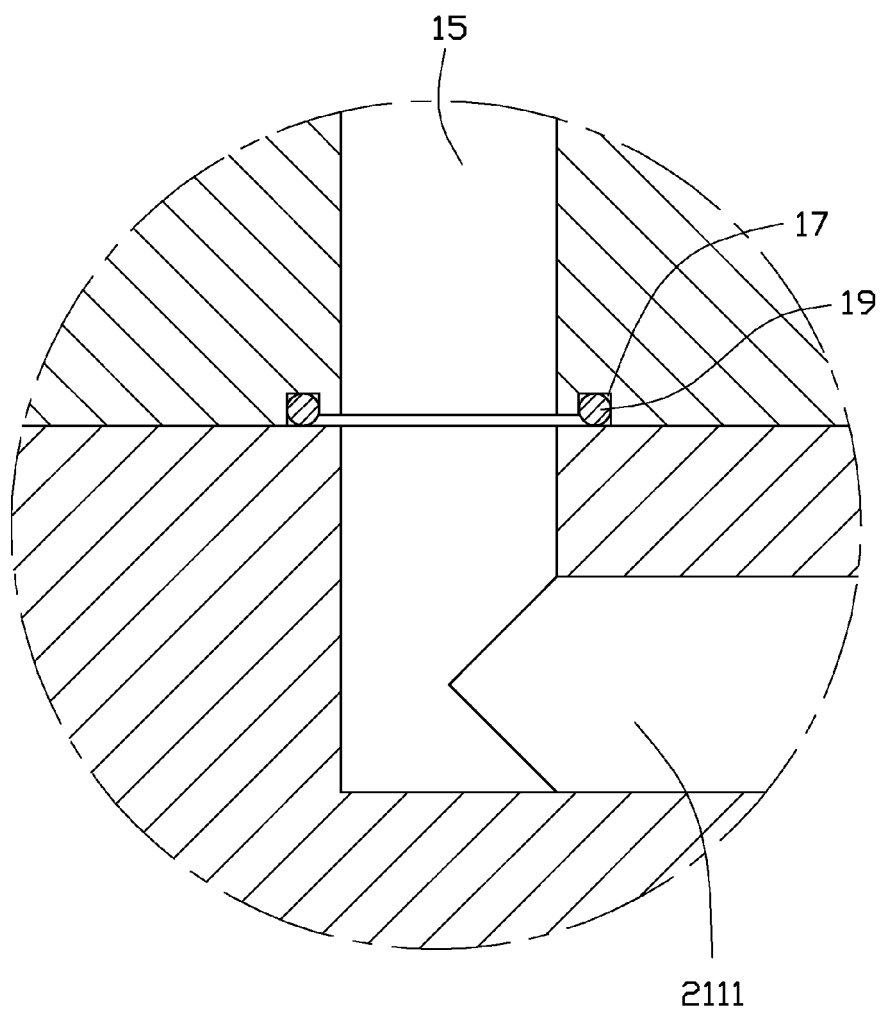
FIG. 5 is a cross-sectional view of an enlarged, circled portion of FIG. 4.

The upper mold 10 is substantially rectangular, and includes an abutting surface 11 on a side thereof and a periphery surface 12. In the embodiment, the abutting surface 11 is perpendicular to the periphery surface 12. The upper mold 10 defines a receiving chamber 13 at a middle portion of the abutting surface 11 and a supporting surface 14 on a bottom of the receiving chamber 13. In the embodiment, the receiving chamber 13 is substantially rectangular. The upper mold 10 further defines a plurality of first cooling channels 15 spaced from and parallel to each other therein. The extending direction of each first cooling channel 15 is a curved line. A cross-section of the first cooling channel 15 is circular. A first end of the first cooling channel 15 cuts through the supporting surface 14 and communicates with the receiving chamber 13, and extends perpendicularly from the supporting surface 14 to the inside of the upper mold 10. A second end of the first cooling channel 15 opposite to the first end thereof cuts through the periphery surface 12 of the upper mold 10 and communicates with the outside. Furthermore, the second end of the first cooling channel 15 is parallel to the supporting surface 14. Referring to FIGS. 4 and 5, the upper mold 10 further defines a plurality of receiving grooves 17 on the supporting surface 14 surrounding and communicating with the plurality of first cooling channels 15. Each receiving groove 17 is located at the first end of the one corresponding first cooling channel 15. A diameter of the receiving groove 17 is greater than the diameter of the first cooling channel 15.

The die core assembly 20 is received in the receiving chamber 13, and includes a base plate 21 and a core plate 23 detachably combined together. Both of the base plate 21 and the core plate 23 are substantially rectangular plates. The base plate 21 is made from medium steel, and includes a first surface 211 and a second surface 213 parallel to each other. The first surface 211 abuts against the supporting surface 14 of the upper mold 10. The base plate 21 defines a plurality of second cooling channels 2111 therein and four mounting holes 2131 on the second surface 213 adjacent to four corners of the base plate 21. The plurality of second cooling channels 2111 are spaced from and parallel to each other. In the embodiment, the second cooling channel 2111 is substantially in a "Π" shape, and includes a pair of terminal portions 2113 and a connecting portion 2115. The pair of terminal portions 2113 is located adjacent to two ends of the base plate 21 and is perpendicular to the first surface 211. The pair of terminal portions 2113 cut through the first surface 211 and communicate with two first cooling channels 15 respectively. The connecting portion 2115 is located within the base plate 21 and parallel to the first surface 211. Opposite ends of the connecting portions 2115 are connected to the pair of terminal portions 2113. Each terminal portion 2113 communicates with the first cooling channels 15 via a washer 19. The washer 19 is received in the receiving groove 17. The four mounting holes 2131 are blind holes.

The core plate 23 includes an engraving surface 231 and a connecting surface 233 parallel to the engraving surface 231, The core plate 23 defines four connecting holes 235. The engraving surface 231 faces the lower mold 30 and includes a plurality of microstructures 2311 engraved by a laser. The connecting surface 233 is combined to the second surface 213 of the base plate 21. The four connecting holes 235 are located at four corners of the core plate 23 and communicate with the four mounting holes 2131, respectively. Screws extend into the four mounting holes 2131 and the four connecting holes 235 to fix the core plate 23 and the base plate 21 together. In the embodiment, the core plate 23 is made of corrosion-resisting die steel.

The lower mold 30 is substantially a rectangular plate. The lower mold 30 includes a parting surface 31 and defines a cavity 33 on a middle portion of the parting surface 31. An amount of space of the cavity 33 is less than that of the core plate 23.

When operating, the melted material is poured into the cavity 33 of the lower mold 30 until a top surface of the melted material is parallel to the parting surface 31. The first cooling channels 15 and the second cooling channels 2111 are filled with water for coiling. The upper mold 10 drives the base plate 21 and the core plate 23 to move toward the lower mold 30 till the abutting surface 11 resisting the parting surface 31. The engraving surface 231 seals the cavity 33 of the lower mold 30 and forms a light guiding plate together with the cavity 33 of the lower mold 30.

Figure 6:
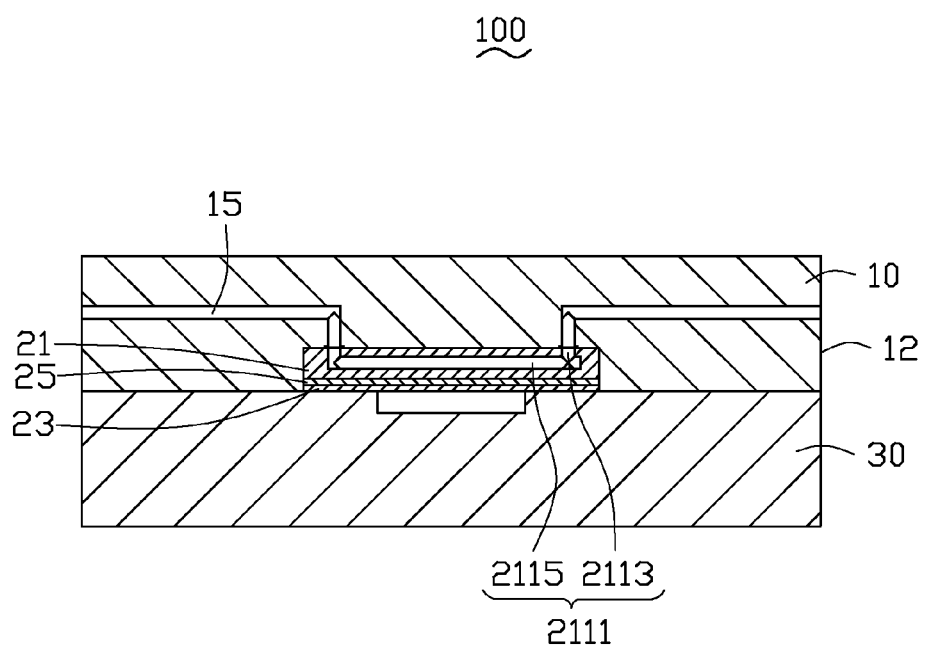
FIG. 6 is similar to FIG. 4, but equipped with a gasket.

FIG. 6 is similar to FIG. 4, and shows a working state of the mold 100. The original microstructures 2311 may be removed and new microstructures 2311 may be engraved on the engraving surface 231 to fabricate a new type of light guiding plate. Meanwhile, a gasket 25 is located between the base plate 21 and the core plate 23 to compensate for a decreasing thickness of the core plate 23 due to the modification or replacement of the microstructures 2311.

The plurality of first cooling channels 15 may cut through a side surface of the receiving chamber 13, the plurality of second cooling channels 2111 may cut through a periphery surface of the core plate 23 and communicate with the plurality of the first cooling channel 15 correspondingly.

The base plate 21 and the core plate 23 may be combined by other structures, such as a latching protrusion (not shown) on the core plate 23 and a latching groove (not shown) on the base plate 21.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A mold for fabricating light guiding plate, comprising:
an upper mold defining one or more first cooling channel therein;
a lower mold defining a cavity thereon; and
a die core assembly mounted to the upper mold, wherein the die core assembly comprises a base plate connected to the upper mold and a core plate detachably located at a side of the base plate facing the lower mold, and at least one gasket, the base plate is made of medium steel and defines one or more second cooling channel therein, and the second cooling channel communicates with the first cooling channel respectively to cool the mold, the core plate is made of corrosion-resisting die steel, and defines an engraving surface facing the lower mold and a plurality of microstructures on the engraving surface thereof, the at least one gasket is located between the base plate and the core plate to compensate for a decreasing thickness of the core plate due to a modification or replacement of the microstructures.

2. The mold of claim 1, wherein the upper mold comprises an abutting surface on a side thereof and a periphery surface perpendicular to the abutting surface, the upper mold defines a receiving chamber on the abutting surface, the die core assembly is received in the receiving chamber.

3. The mold of claim 2, wherein the upper mold further defines a supporting surface on a bottom of the receiving chamber, the base plate comprises a first surface and a second surface parallel to each other, the first surface abuts against the supporting surface of the upper mold.

4. The mold of claim 3, wherein a first end of the first cooling channel cuts through the supporting surface and communicates with the receiving chamber, the second cooling channel comprises a pair of terminal portions cutting through the first surface of the base plate, the pair of terminal portions communicates with two corresponding first cooling channels.

5. The mold of claim 4, wherein the pair of terminal portions are located adjacent to two ends of the base plate and perpendicular to the first surface.

6. The mold of claim 4, wherein the first end of the first cooling channel extends perpendicularly from the supporting surface to the inside of the upper mold, a second end of the first cooling channel opposite to the first end thereof cuts through the periphery surface of the upper mold and communicates with the outside.

7. The mold of claim 6, wherein the extending direction of the first cooling channel is a curved line, a cross-section of the first cooling channel is a circle, the second end of the first cooling channel is parallel to the supporting surface.

8. The mold of claim 4, wherein the second cooling channel further comprises a connecting portion located within the base plate and parallel to the first surface, opposite ends of the connecting portions communicate with the pair of terminal portions.

9. The mold of claim 8, wherein the upper mold further defines a receiving groove on the supporting surface surrounding and communicating with the first cooling channel, the receiving groove is located at the first end of the first cooling channel, a diameter of the receiving groove is greater than that of the first cooling channel, a washer is received in each receiving groove to prevent water leaking.

10. A mold for fabricating light guiding plate, comprising:
an upper mold defining a receiving chamber thereon and a plurality of first cooling channels therein communicating with the receiving chamber;
a lower mold defining a cavity thereon;
a die core assembly receiving in the receiving chamber, wherein the die core assembly comprises a base plate and a core plate detachably combined together, the base plate is made of medium steel and defines a plurality of second cooling channels therein, the plurality of second cooling channels connects with the plurality of first cooling channels respectively to cool the mold, the core plate is made of corrosion-resisting die steel, and defines an engraving surface facing the lower mold and a plurality of microstructures on the engraving surface of the core plate; and
at least one gasket sandwiched between the base plate and the core plate to compensate for a decreasing thickness of the core plate due to a modification or replacement of the microstructures.

11. The mold of claim 10, wherein the upper mold comprises an abutting surface on a side and a periphery surface perpendicular to the abutting surface, the receiving chamber is defined on the abutting surface.

12. The mold of claim 11, wherein the upper mold further defines a supporting surface on a bottom of the receiving chamber, the base plate comprises a first surface and a second surface parallel to each other, the first surface abuts against the supporting surface of the upper mold.

13. The mold of claim 12, wherein the plurality of first cooling channels are spaced from and parallel to each other, a first end of the first cooling channel cuts through the supporting surface and communicates with the receiving chamber, the plurality of second cooling channels are spaced from and parallel to each other, each second cooling channel comprises a pair of terminal portions cutting through the first surface of the base plate, the pair of terminal portions communicates with two corresponding first cooling channels.

14. The mold of claim 13, wherein the first end of the first cooling channel extends perpendicularly from the supporting surface to the inside of the upper mold, a second end of the first cooling channel opposite to the first end thereof cuts through the periphery surface of the upper mold and communicates with the outside.

15. The mold of claim 14, wherein the extending direction of the first cooling channel is a curved line, a cross-section of the first cooling channel is a circle, the second end of the first cooling channel is parallel to the supporting surface.

16. The mold of claim 13, wherein the second cooling channel further comprises a connecting portion located within the base plate and parallel to the first surface, the opposite ends of the connecting portions communicate with the pair of terminal portions.

17. The mold of claim 16, wherein the upper mold further defines a plurality of receiving grooves on the supporting surface communicating with the plurality of first cooling channels, each receiving groove is located at the first end of corresponding one first cooling channel, a diameter of the receiving groove is greater than that of the first cooling channel, a washer is received in each receiving groove to prevent water leaking.

\* \* \* \* \*